United States Patent [19]
Chaupit
[11] 3,723,847
[45] Mar. 27, 1973

[54] SEMICONDUCTOR SYSTEM REDUNDANT CONTROL ARRANGEMENT

[75] Inventor: Jean Chaupit, 92 Fontenay-aux-Roses, France
[73] Assignee: Compagnie Generale D'Electricite, Paris, France

[22] Filed: July 1, 1971
[21] Appl. No.: 158,945

[52] U.S. Cl. ....................321/27 R, 307/219, 321/11
[51] Int. Cl. ....................H02m 7/00
[58] Field of Search .......307/219, 44, 64; 321/11, 27

[56] References Cited

UNITED STATES PATENTS

| | | | |
|---|---|---|---|
| 3,329,905 | 7/1967 | Niertit et al. | 307/219 X |
| 3,479,603 | 11/1969 | Overstreet, Jr. | 307/219 X |
| 3,530,357 | 9/1970 | Leowald | 321/27 R |
| 3,596,168 | 7/1971 | Hengsberger | 321/27 R |
| 3,599,075 | 8/1971 | Etter et al. | 321/11 |

OTHER PUBLICATIONS

Chaupit, Jean, U.S. Patent Application, Ser. No. 41,301, filed on May 28, 1970
Part–2 Redundant Circuit Design, Theodore Goldstein, EEE–April 1963, p. 79

*Primary Examiner*—William M. Shoop, Jr.
*Attorney*—Craig, Antonelli & Hill

[57] ABSTRACT

An arrangement for controlling the operation of a series, parallel, or series-parallel connected assembly of semiconductor devices comprising at least two generators for providing control signals at respective predetermined control frequencies and controlled by a common source, and a respective general control circuit supplied with the control signals by each generator and being at least in part tuned to the respective predetermined control frequency, each general control circuit being arranged to supply the control signals simultaneously to all the semiconductor devices.

9 Claims, 3 Drawing Figures

Patented March 27, 1973 3,723,847

3 Sheets-Sheet 1

INVENTOR

JEAN CHAUPIT

BY Craig, Antonelli & Hill

ATTORNEYS

INVENTOR

JEAN CHAUPIT

BY Craig, Antonelli & Hill

ATTORNEYS

INVENTOR
JEAN CHAUPIT
BY
Craig, Antonelli & Hill
ATTORNEYS

SEMICONDUCTOR SYSTEM REDUNDANT CONTROL ARRANGEMENT

The present invention concerns improvements in and relating to semiconductor device control arrangements, and is more particularly concerned with a modification of the invention disclosed in copending application, Ser. No. 41,301, filed on May 28, 1970, now U.S. Pat. No. 3,654,542, issued Apr. 4, 1972, and assigned to the same assignee as the present application.

In the prior application, there is described an arrangement for controlling the operation of a series, parallel, or series-parallel connected assembly of semiconductor devices, comprising a generator for providing control signals at a predetermined control frequency, and a general control circuit supplied with the control signals by the generator and being at least in part tuned to the predetermined control frequency, the general control circuit being arranged to supply the control signals simultaneously to all the semiconductor devices connected to that part of the general control circuit tuned to the predetermined control frequency.

The arrangement comprises a control source which periodically and for a particular period triggers a sinusoidal waveform generator whose output is connected to an oscillatory circuit comprising a capacitance and a cable threading the magnetic circuit of one or more control transformers of the semiconductor elements.

FIG. 1 of the drawings accompanying the parent patent shows a column of thyristors connected in series and divided into sections, each of which comprises a particular number of thyristors connected in series. FIG. 4 shows another arrangement in which an assembly of transistors connected in parallel is supplied by a single generator.

With series-parallel assemblies of semiconductor elements, the use of a single generator is not always possible, as the power requirements of such an assembly can exceed the power available from a single high frequency sinusoidal signal source. The use of more than one generator connected in parallel presents problems: it is difficult to ensure that the generators have exactly the same frequency, and without special precautions the phases of the various output signals differ widely.

In addition, when reliability of operation is required, it may be necessary to use two generators in parallel simultaneously, even though a single generator would be capable of providing the necessary power required. Similar problems occur as in the case where two generators are used when the power available from one is not sufficient.

In accordance with the present invention, an arrangement for controlling the operation of a series, parallel, or series-parallel connected assembly of semiconductor devices comprises at least two generators for providing control signals at respective predetermined control frequencies and controlled by a common source, and a respective general control circuit supplied with the control signals by each generator and being at least in part tuned to the respective predetermined control frequency, each general control circuit being arranged to supply the control signals simultaneously to all the semiconductor devices.

The generators may have substantially equal control frequencies.

The invention will now be described in more detail, by way of examples only and with reference to the accompanying diagrammatic drawings in which.

Figure 1:
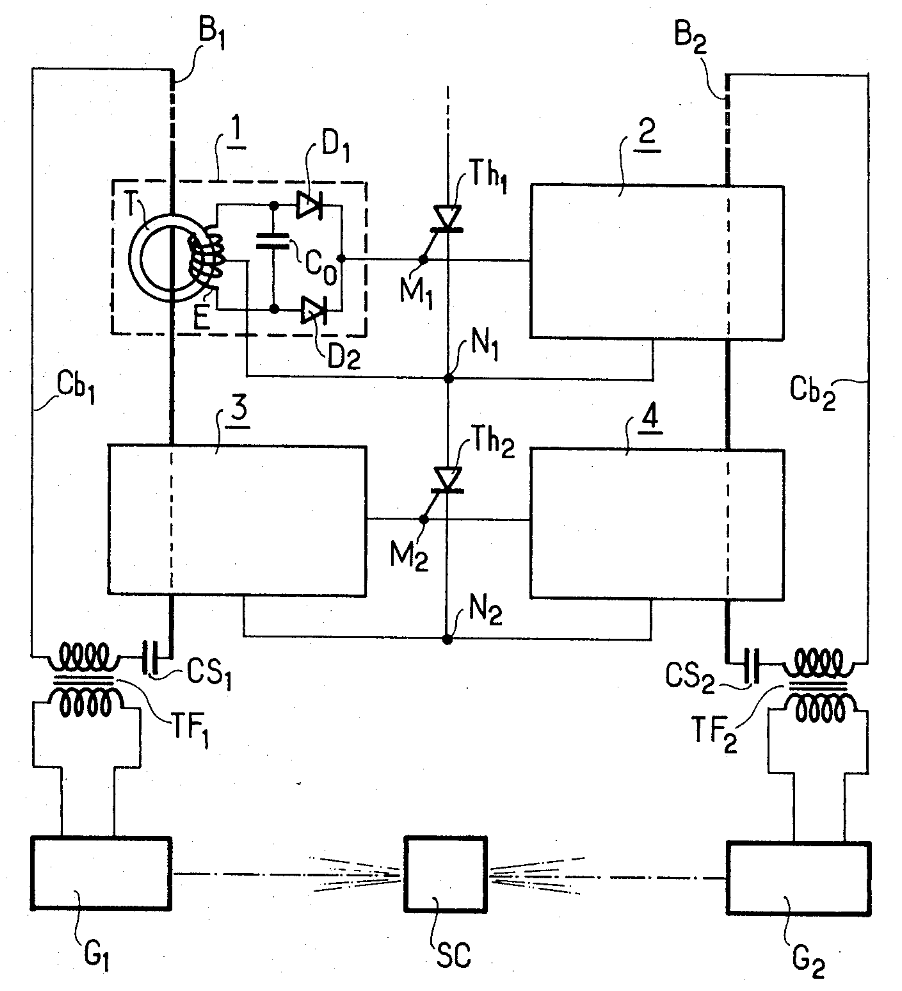
FIG. 1 is a schematic circuit incorporating two thyristors in series.

Referring to FIG. 1, first and second thyristors $Th_1$ and $Th_2$ are connected in series and are controlled by respective generators $G_1$ and $G_2$ through respective general control circuits $B_1$ and $B_2$. The generators $G_1$ and $G_2$ are controlled by a common source SC, which may be an optical source, for example.

The general control circuit $B_1$ includes a cable $Cb_1$ in series with a capacitance $CS_1$ and the secondary winding of a transformer $TF_1$. The primary winding of this transformer is connected to the generator $G_1$. The general control circuit $B_1$ also includes individual control circuits 1 and 3 each including a toroidal transformer T the magnetic circuit of which is threaded by a cable $Cb_1$.

General control circuit $B_2$ includes a cable $Cb_2$ in series with a capacitance $CS_2$ and the secondary winding of another transformer $TF_2$ whose primary winding is connected to the generator $G_2$. It further includes individual control circuits 2 and 4, each including a toroidal transformer T (not shown) whose magnetic circuit is threaded by the cable $Cb_2$.

Control circuits 1, 2, 3 and 4 are identical and suitably are those described in FIG. 2*a* of the above-referenced patent. Other forms of circuit may be used, however, such as that shown in FIG. 2*b* of the referenced patent.

Each transformer T has a center-tapped winding E shunted by a capacitance $C_o$. Each end of the winding E is connected to the anode of a respective diode $D_1$ or $D_2$ whose cathodes are connected together to constitute one output of the circuit whose other output is the center-tap of the winding E. The first output is connected to the gate $M_1$ or $M_2$ of the respective thyristor $Th_1$ or $Th_2$, and the second output is connected to the respective cathode $N_1$ or $N_2$.

Each thyristor receives, between its gate and cathode, a control signal provided by generators $G_1$ and $G_2$ simultaneously. The signals have the same amplitude and the current flowing in the control junction of the thyristor is the sum of the currents due to each generator $G_1$ and $G_2$, after rectification. Difficulties with phase differences between the generators are thus avoided, and it is possible for the generators to operate at different frequencies.

Figure 2:
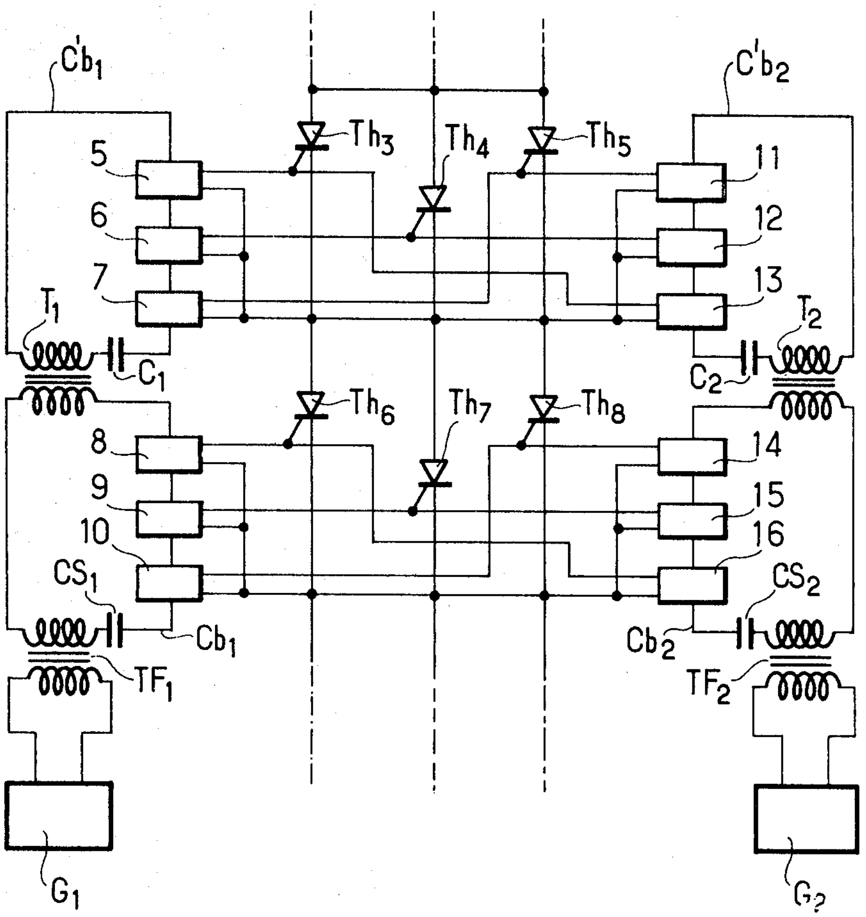
FIG. 2 is a schematic circuit including six thyristors in series-parallel connection.

FIG. 2 shows six thyristors $Th_3$ to the $Th_8$ connected in series-parallel arrangement consisting of two series-connected groups each of three parallel-connected thyristors.

A first generator $G_1$ is connected to the primary winding of a transformer $TF_1$ whose secondary winding is connected in series with a capacitance $CS_1$, cable $Cb_1$ and the primary winding of a further transformer $T_1$. The secondary winding of transformer $T_1$ is connected in series with a capacitance $C_1$ and a cable $C'b_1$.

Cable $C'b_1$ links transformers of individual control circuits 5, 6 and 7 in the manner just described with reference to FIG. 1. Similarly, cable $Cb_1$ links individual control circuits 8, 9 and 10. The two cable circuits and individual circuits 5 to 10 make up a general control circuit associated with the first generator $G_1$.

First outputs of circuits 5, 6 and 7 are connected together and to the cathodes of the thyristors $Th_3$ to $Th_5$. Second inputs of circuits 5, 6 and 7, respectively, are connected to the gates of thyristors $Th_3$, $Th_4$ and $Th_5$. Circuits 8, 9 and 10 are analogously linked to thyristors $Th_6$, $Th_7$ and $Th_8$.

A second generator $G_2$ is linked to a general control circuit analogous to that of generator $G_1$ and which will therefore not be described in detail. It comprises transformers $TF_2$ and $T_2$, with cables $Cb_2$ and $C'b_2$, capacitances $CS_2$ and $C_2$, and individual control circuits 11 to 16. First outputs of circuits 11 to 13 are connected together and to the cathodes of thyristors $Th_3$ to $Th_5$, second inputs of circuits 11, 12 and 13 being connected to the gates of thyristors $Th_5$, $Th_4$ and $Th_3$ respectively. Circuits 14 to 16 are analogously linked to thyristors $Th_8$ to $Th_6$.

It will be appreciated that each general control circuit may comprise a single cable, rather than the two cables shown in FIG. 2, but this point will not be elaborated here as these considerations are discussed more fully in the above-referenced patent. By the same token, the operation of the circuit of FIG. 2 need not be described in detail.

Figure 3:
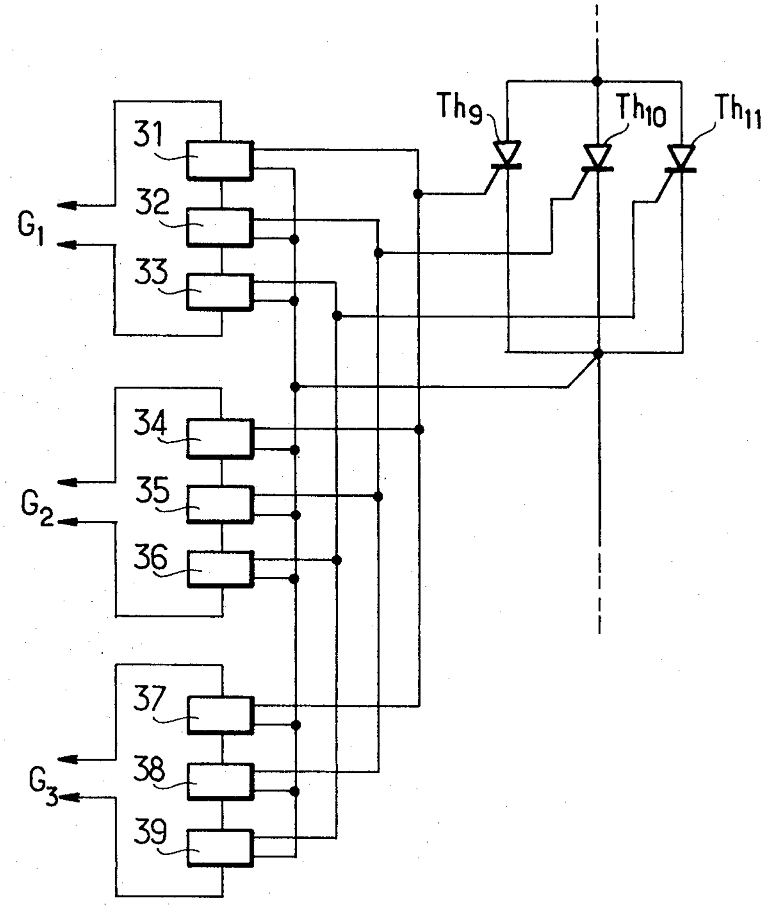
FIG. 3 is a schematic circuit including three thyristors in parallel.

FIG. 3 shows the connection of a parallel-connected group of three thyristors $Th_9$, $Th_{10}$ and $Th_{11}$ to three generators $G_1$, $G_2$ and $G_3$ (not shown). Each generator is associated with a general control circuit comprising three individual control circuits as follows: for generator $G_1$, circuits 31, 32 and 33; for generator $G_2$, circuits 34, 35 and 36; and for generator $G_3$, circuits 37, 38 and 39. Each general control circuit is connected to all thyristors as follows: thyristor $Th_9$ receives a compound signal from circuits 31, 34 and 37; thyristor $Th_{10}$ receives a composite signal from circuits 32, 35 and 38; and thyristor $Th_{11}$ receives a composite signal from circuits 33, 36 and 39.

The operation of the circuitry of FIG. 3 is self-evident, and it will be appreciated that this form of interconnection can be extended to series-connected assemblies of thyristors connected in parallel.

The circuit arrangements just described offer improved reliability in the control of complex assemblies of semiconductor elements, which are not necessarily thyristors as in the examples discussed in detail, through the provision of at least two distinct control circuits, each comprising a signal generator. The problem of insufficient power available from a single signal generator is also overcome.

The circuit arrangements will find widespread application where assemblies comprising large numbers of semiconductor elements are required, as in rectification bridges and columns for the continuous transfer of energy.

We claim:

1. An arrangement for controlling the operation of a connected assembly of semiconductor devices comprising at least first and second generator means for providing control signals at respective predetermined control frequencies, a common source controlling said first and second generator means, and respective first and second general control circuit means supplied with the control signals from said first and second generator means and being at least in part tuned to the respective predetermined control frequencies for supplying said control signals simultaneously to all of the semiconductor devices connected to that part of said control circuit means tuned to said predetermined control frequency.

2. A control arrangement as claimed in claim 1 wherein the control frequencies of both said first and second generator means are substantially equal.

3. A control arrangement as claimed in claim 1, the assembly of semiconductor devices comprising a number of subassemblies, and wherein said first and second general control circuit means each include a control circuit associated with each subassembly, each such subassembly control circuit being tuned to a predetermined control frequency and being connected to apply a control signal from said respective first and second generator means at the frequency to which it is tuned simultaneously to all of the semiconductor devices of the associated subassembly.

4. A control arrangement as claimed in claim 3, wherein each subassembly control circuit save one includes a control transformer, an electric cable threading the magnetic circuit of the control transformer, and a capacitance connected in series with the cable, the secondary winding of the associated section transformer and the primary winding of the succeeding section transformer, said one subassembly control circuit being that associated with the final section transformer of the cascade and which includes a control transformer, an electric cable threading the magnetic circuit of the control transformer and a capacitance connected in series with the cable and the secondary winding of the final section transformer of the cascade.

5. A control arrangement as claimed in claim 3, wherein each subassembly control circuit includes the control transformer, an electric cable threading the magnetic circuit of the control transformer and a capacitance, the cable and capacitance being connected in parallel with the secondary winding of the associated section transformer.

6. A control arrangement as claimed in claim 3, wherein each subassembly control circuit includes a control transformer, an electric cable threading the magnetic circuit of the control transformer and a capacitance, the cable and capacitance being connected in series with each other and in series with the cables and capacitances of all other subassembly control circuits across the generator output to constitute said control circuit means.

7. The control arrangement as claimed in claim 6, wherein each subassembly control circuit includes a single control transformer having a separate secondary winding for each semiconductor device of the subassembly.

8. A control arrangement as claimed in claim 6, wherein each subassembly control circuit includes at least two control transformers each having a separate secondary winding for at least one semiconductor device of the subassembly, the magnetic circuits of said control transformers being threaded by a common electric cable.

9. A control arrangement as claimed in claim 7, wherein each secondary winding of each control transformer is center-tapped and the associated rectifier circuit comprises a pair of semiconductor rectifier diodes having their first electrodes connected together to a first output terminal of the rectifier circuit and their second electrodes connected to respective ends of the secondary winding, the center tap being connected to a second rectifier circuit output terminal.

* * * * *